June 28, 1949.　　　O. C. DRESSER ET AL　　　2,474,235
PNEUMATIC IMPACT DEVICE
Filed Dec. 14, 1945　　　　　　　　　　　　5 Sheets-Sheet 1

Inventors
OSCAR C. DRESSER
OSCAR NORGORDEN
FRANCIS J. SHANAHAN
CARROLL R. SHULER Attorney

FIG-4

June 28, 1949.　　　O. C. DRESSER ET AL　　　2,474,235
PNEUMATIC IMPACT DEVICE
Filed Dec. 14, 1945　　　　　　　　　　　　　　5 Sheets-Sheet 4

Inventors
OSCAR C. DRESSER
OSCAR NORGORDEN
FRANCIS J. SHANAHAN
CARROLL R. SHULER

By

M. C. Hayes

Attorney

June 28, 1949.　　O. C. DRESSER ET AL　　2,474,235
PNEUMATIC IMPACT DEVICE

Filed Dec. 14, 1945　　　　　　　　　　　5 Sheets-Sheet 5

Inventors
OSCAR C. DRESSER
OSCAR NORGORDEN
FRANCIS J. SHANAHAN
CARROLL R. SHULER By M. O. Hayes
Attorney Patented June 28, 1949

2,474,235

UNITED STATES PATENT OFFICE 2,474,235

PNEUMATIC IMPACT DEVICE

Oscar C. Dresser, Arlington, Va., Oscar Norgorden, Washington, D. C., and Francis J. Shanahan, Alexandria, and Carroll R. Shuler, Stanley, Va.

Application December 14, 1945, Serial No. 635,118

7 Claims. (Cl. 121—21)

(Granted under the act of March 3, 1883, as amended April 30, 1928; 370 O. G. 757)

This invention relates to pneumatic impact devices and more particularly to pneumatic impact devices for shock testing apparatus and methods of controlling the impact devices.

Where apparatus is to be subjected in use to severe shocks, as for example where apparatus is to be mounted on ship board and subjected to concussion and shock due to firing of the ship's guns as well as to shocks resulting from enemy action, it becomes necessary to so design the apparatus and the mounting for the apparatus that the apparatus will withstand these shocks. For this reason impact or shock testing machines have been developed whereby the apparatus may be subjected to shocks or impacts simulating that which will be encountered in actual use. While impact devices have been heretofore available, in general these devices have included no means for controlling the duration of the shock applied to the apparatus being tested and have been capable of delivering only a very short duration shock. Thus where large articles or articles having a considerable height are subjected to shocks, the force of the shock is largely absorbed in the lower portions of the article and no substantial force reaches the upper portions. By increasing the duration of the shock, however, it is possible to cause the force to be applied more uniformly over the article being tested. Furthermore, it has been found that the more common types of shocks encountered in practice are of relatively long duration and hence unless the impact device is capable of delivering a similar type of shock, the value of the impact test becomes very questionable.

Another important consideration in impact or shock testing is that but one blow be delivered and that secondary shocks be eliminated or reduced to such a magnitude that they are unimportant. Where the forces involved are very large the elimination of secondary shocks resulting from recoil and rebound is extremely difficult. Failure to eliminate secondary shocks, however, results in an impact test of unknown or at best difficult to estimate characteristics.

An object of this invention is to provide a new and improved pneumatic impact device.

A further object of this invention is to provide a pneumatic impact device which will not produce secondary shocks.

A further object of the present invention is to provide a pneumatic impact device whereby the acceleration, duration, and velocity of the shock may be accurately controlled, and a method of controlling these factors.

In accordance with one embodiment of this invention, a pneumatic impact device may be provided comprising a large cylinder having mounted in the forward end thereof a striker shaft fixed to a piston, slidably journalled in the cylinder. A second piston is also journalled in the cylinder and spaced from the first piston. Means are provided for controlling the gas pressure between the two pistons to control the duration and acceleration of impact and means are provided for applying air pressure to the second piston while retaining the second piston in cocked position. Means are also provided for releasing the second piston to cause the first piston to move the striker shaft forward with great force. Means are also provided for preventing secondary shocks resulting from rebound of the second piston.

Other objects and advantages of the present invention will be apparent from the following detailed description taken in conjunction with the drawings wherein:

Fig. 3 is a detail, sectional view taken along the line 3—3 of Fig. 2;

Impact or shock testing apparatus usually comprises two elements: a movable platform on which the apparatus to be tested is supported and to which it is secured, and an impact device for delivering a blow to the platform whereby a shock will be applied to the apparatus. The present invention is directed solely to the impact device and is intended for use with any suitable apparatus support.

Figure 1:
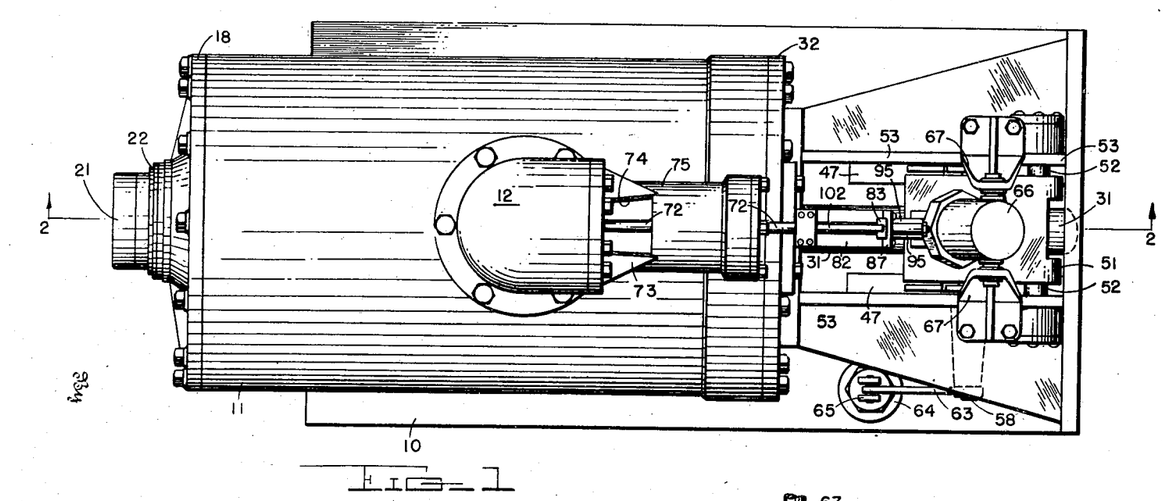
Fig. 1 is a plan view of a pneumatic impact device constructed in accordance with one embodiment of this invention.
Figure 2:
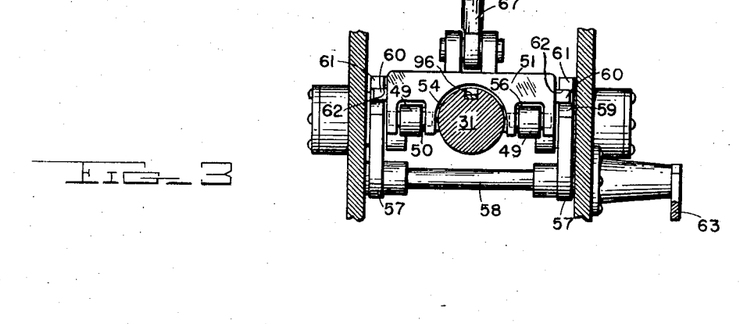
Fig. 2 is a sectional view taken substantially along the line 2—2 of Fig. 1.

Referring now to the drawings, and particularly to Figs. 1 and 2 thereof, it will be seen that this device includes a base plate 10 on which is rigidly mounted a large cylinder 11. An exhaust chamber 12 is mounted on the upper side of the cylinder and is connected thereto by longitudinally extending slots 13 formed through the upper side of the cylinder at the base of the exhaust chamber.

Slidably mounted in the left portion of the cylinder 11 is a heavy piston 14, the periphery of which closely engages the interior wall of the cylinder 11 and is provided with a number of piston rings 15 fitted into annular grooves 16, formed in the periphery of the piston. A short striker shaft 17 is mounted on the left face of the piston 14, substantially in the center thereof, and extends slidably through a suitably apertured end plate 18, rigidly fixed to the left end of the cylinder 11. In practice, it has been found desirable to form the shaft 17 integrally with the piston 14; however, this is not necessary if suitable means be employed for securing the shaft to the piston 14. The left end of the piston shaft 17 is provided with a striker plate 21 formed of a material which will resist deformation resulting from impact, such as manganese steel. In order to prevent the piston 14 from being withdrawn too far into the cylinder 11, a retaining collar or flange 22 is mounted in an annular groove 23 formed in the periphery of the shaft 17 and spaced slightly from the left end thereof, the collar 22 being so located as to bear against a shoulder portion 24, integrally formed with left side of the end plate 18 of the cylinder 11, when the piston 14 is moved to its extreme right position.

Slidably mounted within the cylinder 11 and spaced from the right side of the piston 14 is a second piston 28 of similar dimensions to the piston 14 and provided with annular peripheral grooves 29 in which are disposed piston rings 30. The rear piston 28 is provided with a long, heavy shaft 31 which extends to the right, as viewed in Fig. 2, through an end plate 32 rigidly mounted on the right end of the cylinder 11, the piston shaft being slidably journalled in a stuffing box 33 mounted in the end plate 32 to prevent leakage of air during movement of the shaft 31. A retaining sleeve 34 is associated with the stuffing box 33 and is adjustable to compress the stuffing to obtain the desired tightness of fit.

Since it is impractical to make the shaft 31 integrally with the piston 28, because of the considerable length of the shaft 31, the left end of the shaft 31 extends through the center portion of the piston 28 and is provided with a flanged end portion 35 at its left end which seats in a flared portion 36 of an aperture 37 formed through the piston 28. A heavy sleeve-shaped nut 38 is threaded on the portion of the shaft 31 extending to the right from the right side of the piston 28 and is adjusted to rigidly secure the shaft 31 to the piston. A locking pin 39 is associated with the nut 38, as is well known in the art, to prevent loosening of the nut.

By flaring the left end of the shaft 31, the mass per unit area of the exposed end of the shaft is made substantially equal to the mass per unit area of the remainder of the left side of the piston 28 and thus, since the effect of the pressure in the space between the pistons will be exerted on the piston 28 and the shaft 31 proportionally to their relative areas, a substantial reduction is made possible in the amount of the thrust that must be carried by the nut 38 during acceleration of the piston and shaft. At the same time, the shaft is rigidly secured to the piston so that there is no possibility of the shaft being separated from the piston during forward movement of the piston; because of the very large forces involved in the operation of this apparatus, this is an important consideration.

While by reason of the design of this apparatus, the force or momentum present as the piston 28 and shaft 31 rebound or recoil after an impact has been delivered is largely absorbed or expended in forcing the air trapped behind this piston 28 in the charging chamber out of the exhaust chamber, in some cases due to variations in the load on the platform or to variations in the charging pressure or other conditions, some force may not be absorbed, and the piston may move rearwardly with considerable momentum. Since the exhaust slots or ports 13 are located substantially in the mid-portion of the cylinder 11, the portion of the cylinder to the right of the ports has no outlet and may be employed as pressure chamber. Thus, if the piston 28 recoils past the ports 13, the air in this pressure chamber is compressed thereby and the momentum thereof largely absorbed. In order to prevent damage to the stuffing box assembly 33 in the event that the exhaust chamber is not opened or other failure occurs, a sleeve 43 is mounted inside the right end of the cylinder 11 and is provided with a heavy rim 44 at its left end which serves as a seat against which the piston 28 may strike. Ordinarily, however, the piston will not recoil sufficiently to cause it to strike.

Figure 7:
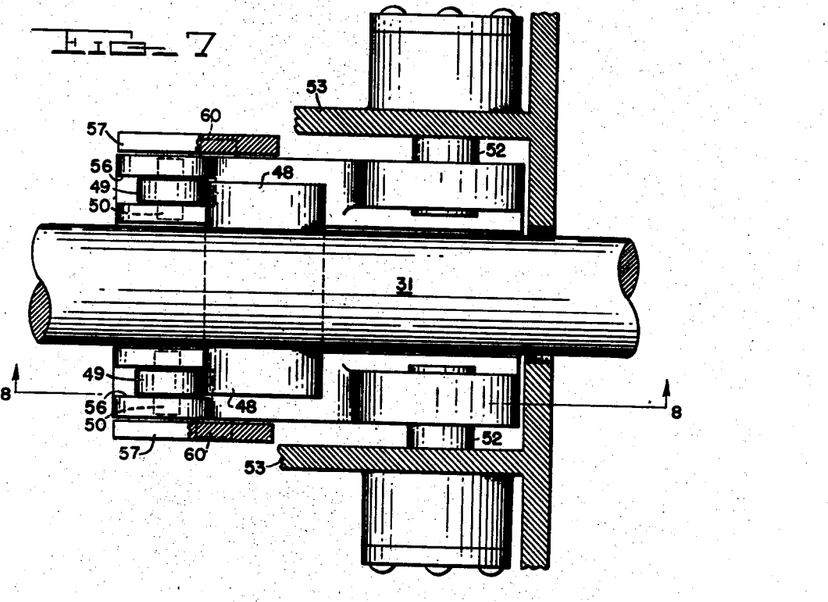
Fig. 7 is a fragmentary section taken substantially along the line 7—7 of Fig. 2.

The starting position of the pistons 14 and 28 is shown in Fig. 2. In this position the piston 14 is retracted to the right so that the collar 22 seats against the shoulder 24 formed on the left side of the end plate 18, while the piston 28 is positioned so that its right edge is immediately to the left of the ports 13 formed in the upper side of the cylinder 11 and communicating with the exhaust chamber 12. The piston 28 is initially locked in this position by a locking mechanism located to the right of the end plate 32 and arranged so as to be engageable with the shaft 31, the locking mechanism being shown in Figs. 2, 3, 7, and 8. As shown in these drawings, a heavy, flat bar 48 is mounted transversely through the shaft 31 at a point suitably spaced from the right end thereof, the outer ends of the bar projecting a substantial distance from either side of the shaft. In locked position the left sides, as viewed in Figs. 7 and 8, of the outwardly projecting portions of the bar 48 bear against a pair of heavy, spaced rollers 49 located on either side of the shaft 31 and rotatably mounted on a pair of spaced, axially aligned shafts 50 journalled in the left end portion of a suitably formed, pivotally supported, latching block 51, the rollers 49 being so disposed with respect to the bar 48 that the axis of the rollers lies in a plane with the midpoint of the left faces of the bar 48 when in locking relation, thus providing a condition of substantial equilibrium wherein slight restraint is required to maintain the block 51 in locking relation, that is, to prevent the block 51 from pivoting upward prematurely. Rotation of the shaft during longitudinal movement thereof is prevented and alignment of the bar 48 with the rollers 49 is maintained by a pair of spaced, parallel guide rails 47 which are mounted on the opposed, inner sides of a pair of spaced, parallel, upright plates or walls 53, rigidly fixed to the base 10 of the apparatus. The rails 47 extend to the right from a point slightly spaced to the left of the rollers 49, when the rollers are in locking position, a sufficient distance so that at all times the undersides of the bar 48 bear against the upper surfaces of the rails.

Figure 8:
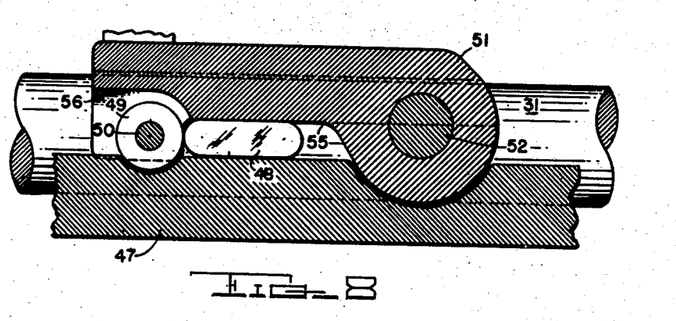
Fig. 8 is a section taken along the line 8—8 of Fig. 7.

The block 51 is pivotally mounted at its right end on a pair of axially aligned stub shafts 52, which are rigidly secured to the block and extend a short distance from either side of the block, the outwardly extending portions thereof being suitably journalled in the upright walls 53. As may be seen in Fig. 3, the block 51 has formed along the center of the underside thereof a semi-cylindrical recess 54 which extends the length thereof and which, when the block is pivoted downwardly to bring the rollers into locking position, receives the upper portion of the shaft 31, thus permitting the rollers to be aligned as hereinbefore described with the bar 48. To expose the right portions of the rollers so they may bear against the bar 48, as shown in Fig. 8, the block 51 is provided with a transversely extending recess 55 in its lower side of sufficient depth and width both to expose the rollers and also to receive the outwardly extending portions of the bar 48. Wide slots 56 are formed through the left, lower portions of the block, as shown in Figs. 3 and 8, to accommodate the rollers.

Because of the substantial equilibrium obtained when the rollers are in locking relation to the bar 48, it is relatively simple to hold the rollers in this position and little restraint is required. While it is desired to prevent forward movement of the shaft 31, the block 51 is prevented from pivoting upward by a pair of spaced, cam plates 57, which are pivotally supported on either side of the block 51 by a shaft 58. The shaft 58 extends between and the ends thereof are journalled in the upright walls 53, the shaft being disposed beneath and at right angles to the path of reciprocation of the shaft 31. The upper portions of the cam plates are formed to provide arcuate cam surfaces 59, which, when the rollers are in locking position, bear against the undersides of lugs 60, which may be integrally formed with either side of the block 51 and extend outwardly therefrom a short distance. Referring to Figs. 2 and 3, it will be seen that the upper portion of each of the cam plates 57 has integrally formed with the right end thereof a shoulder 61 and that the shoulder is provided with an undercut recess or notch 62 of suitable size to receive the lug 60, the lower surface of the recess being in a plane with the arcuate cam surface of the cam plate. When the cam plates are pivoted in a counter-clockwise direction, as viewed in Fig. 2, the lugs 60 enter the recesses 62 and accidental upward pivotal movement of the block 51 is effectively prevented.

Figure 4:
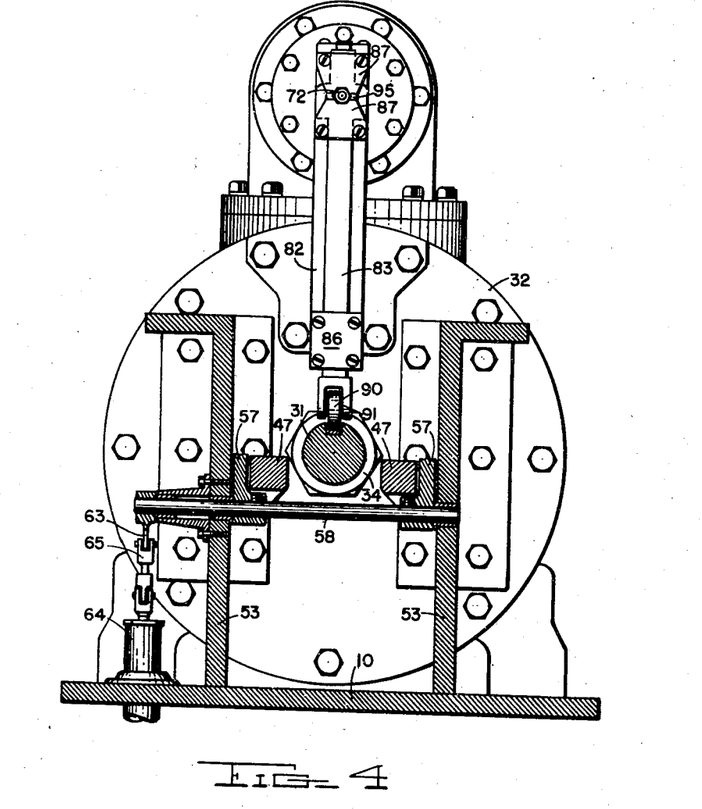
Fig. 4 is a section taken along the line 4—4 of Fig. 2.

When it is desired to release the shaft 31, the cams 57 are pivoted in a clockwise direction by a crankarm 63 fixed to the outer end of the shaft 58, which, as shown in Fig. 4, extends a suitable distance beyond the left, upright wall 53. Referring again to Fig. 2, it will be seen that an actuating device, such as the piston assembly 64, is connected to the outer end of the crankarm 63 by a link bar 65 so that when the piston 64 moves upwardly, the cam plates will be pivoted in a clockwise direction and conversely when the piston moves downwardly, the cam plates will be pivoted in a counterclockwise direction, locking the block 51 in position. When the cam plates are moved in a clockwise direction in releasing the shaft 31, initially the lugs 60 are disengaged, the recessed shoulders 61 moving to the right relatively thereto, and then the arcuate cam surfaces 59 bearing against the undersides of the lugs 60 push the lugs and block 51 slightly upwardly. This terminates abruptly the substantial equilibrium theretofore present and since at the pressures used with this apparatus, the forces urging the piston 28 and shaft 31 forward are very great, by reason of the camming action of the bar 48 bearing now against the lower portions of the rollers 49, the block 51 will be deflected upwardly with great force. In order to prevent damage to the apparatus from this sudden, upward thrust of the block 51, a shock absorber 66 is provided and is pivotally mounted on spaced brackets 67, which are in turn fixed to the upper sides of the upright walls 53. The shock absorber piston shaft 68 is pivotally connected to the forward end of the block 51. The shock absorber while permitting the block 51 to be pivoted upwardly, prevents the block from being pivoted beyond a suitable point and also absorbs the thrust resulting from the camming action of the bar 48 and rollers 49.

In preparing this impact device to deliver an impact or shock, the exhaust chamber 12 is closed by a poppet valve 70 which seats in the left end of an aperture 71 formed through the right side of the exhaust chamber 12, as may be seen in Fig. 2. The poppet valve is provided with a long valve stem 72 which extends to the right therefrom through a small housing 73, provided with large ports 74, and into a cylinder 75 fixed to the right end of the housing 73, the valve stem being suitably journalled through the end walls of the cylinder 75. The portion of the valve stem disposed in the cylinder 75 has fixed thereto a piston 76, which is reciprocable in the cylinder 75, and ports 77 and 78 are formed, respectively, in the left portion of the cylinder 75 closely adjacent the left end wall thereof and adjacent the right end thereof to permit application of pressure to either side of the piston as required to control the operation of the poppet valve. By admitting air under pressure to the port 77, the poppet valve may be seated, thus closing the exhaust chamber, or by admitting air under pressure to the port 78, the poppet valve will be moved to the left, thus opening the exhaust chamber.

Port 77, which is formed adjacent the left end of the cylinder 75, is selected to have such a size with respect to the size of the chamber provided in the cylinder 75 between the left end wall and the piston 76 that when the piston 76 starts to move to the left in the operation of the apparatus, the air in this chamber will be compressed somewhat and then will escape at a controlled rate through the port 77, thus absorbing the kinetic energy of the moving piston 76 and substantially preventing rebound thereof which would tend to seat the poppet valve and close the exhaust chamber. In order to prevent any effective closing of the exhaust chamber such as might result from slight rebound, the displacement of the poppet valve resulting from the movement of the piston 76 to the left is made to be substantially greater than the distance required to open the exhaust chamber outlet; thus, any slight recoil of the piston 76 is rendered insufficient to affect the effective opening of the exhaust chamber.

The cylinder 75 is made to have an internal diameter slightly less than the effective diameter of the poppet valve aperture 71 and thus when the pressure in the exhaust chamber is equal to the pressure in the right portion of the cylinder 75, tending to force the poppet valve to the left and to open the exhaust chamber, because of the difference in the static forces acting respectively on the poppet valve and on the piston 76, the poppet valve will remain seated, the seating force being then equivalent to the difference between the static force acting on the poppet valve and the static force acting on the piston 76.

Figure 5:
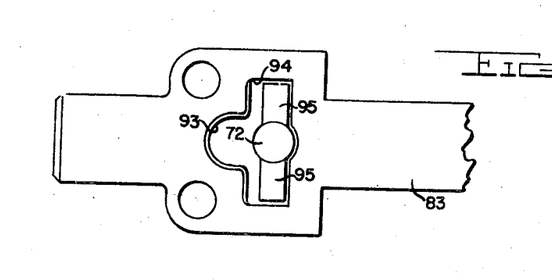
Fig. 5 is a fragmentary, detail view of the upper end of the pushrod latching mechanism.

In the operation of this apparatus, after the piston shaft 31 has been released and the piston 28 has begun to move to the left under the force of the air pressure in the charging chamber, that is the portion of the cylinder 11 to the right of the piston 28, the pressure in the charging chamber and exhaust chamber will drop due to the adiabatic expansion of the air. Where the pressure on the right side of the piston 76 has been adjusted to be equal to the charging pressure, which is the desired operating condition, this drop in pressure will cause the poppet valve to tend to open. Early opening of the poppet valve obviously would release the charging pressure prior to the completion of the thrust of the piston 28. Thus, in order to prevent premature opening of the poppet valve 70, a latching mechanism is provided and is associated with the right portion of the poppet valve assembly, as shown in Figs. 2, 4, and 5. The right portion of the poppet valve stem 72, that is the portion thereof extending from the right side of the piston 76 through the right end wall of the cylinder 75, is made quite long and is journalled through the upper portion of a vertically disposed, supporting plate 82, the plate 82 being rigidly mounted on the end wall 32 of the cylinder 11. The right end of the stem 72 extends substantially beyond the right edge of the plate 82, as may be seen in Fig. 2. A vertically movable pushrod 83 is slidably journalled in two vertically spaced shoulders 84 and 85 integrally formed with the right edge of the plate 82 at the upper and lower ends thereof. These shoulders are suitably recessed to receive the pushrod and to serve as guides therefor, the pushrod being held in position therein by a retaining plate 86 fixed to the lower shoulder and a pair of vertically spaced, retaining plates 87 fixed to the upper shoulder, the upper retaining plates being spaced to permit the outer end of the stem 72 to extend therebetween. A roller 90 which, serves as a cam follower, is mounted at the lower end of the pushrod on a short shaft 91 suitably journalled in the lower end of the push rod 83 and the roller 90 bears on the upper surface of the piston shaft 31. The upper portion of the push rod 83 is provided with a semi-cylindrical aperture 93 of slightly greater diameter than the valve stem 72, which extends therethrough and the base of the aperture 93 opens into a larger aperture 94 formed immediately therebeneath. A pair of key rails 95 are mounted on either side of the valve stem 72 at the right end thereof and are so located with respect to the push rod 83 that when the push rod is in its lower position, the left ends of the rails 95 bear against the right face of the push rod, the upper portion of the valve stem 72 being then disposed in the semi-cylindrical aperture 93 formed in the upper portion of the push rod. By suitably spacing the retaining plates 87 mounted on the push rod supporting bar 84, the outer portions of their opposed edges will engage the upper and lower sides of the key rails 95 and prevent rotation of the valve stem, thus maintaining the proper alignment of the key rails with respect to the apertures 93 and 94 formed in the push rod 83.

It will be apparent that in order to permit the poppet valve 70 to move to the left to open the exhaust chamber 12, it is necessary that the push rod 83 move upward a sufficient distance so that the valve stem 72 and associated key rails 95 may move through the larger aperture 94 formed immediately beneath the semi-cylindrical aperture 93 in the push rod 83. In order to move the push rod 83 in timed relation to the movement of the piston 28, the upper surface of the piston shaft 31 immediately beneath the roller 90 is indented slightly to form an inclined cam surface 96, the lower portion of the cam surface 96 being so located on the piston shaft 31 that when the piston 28 is in its starting position, the roller 90 at the lower end of the push rod 83, bears against the lower-most portion of the cam surface. Then as the shaft 31 is moved to the left, the inclination of the cam surface 96 being upward to the right, the push rod 83 is cammed upward, releasing the valve stem 72 and permitting the valve 70 to open the exhaust chamber 12.

At the start of a cycle of operation of this pneumatic impact device, the exhaust chamber 12 is closed by admitting air through the port 77 to the left side of the piston 76 disposed in the poppet valve cylinder 75, thus moving the poppet valve 70 into the closed position. The push rod 83 then moves downwardly, being urged downwardly by a flat spring 102 mounted on the upper side of the bar 84 and bearing against the upper end of the push rod 83. This locks the valve stem 72 in its extreme right position. Either prior thereto, or at the same time, air may be admitted through a port 100, located to the left of piston 14 in the lower side of the cylinder 11, to force the piston 14 to the right, until the collar 22 seats against the shoulder 24 formed on the end plate 18. It will be understood that any other suitable means may be employed for retracting the striker piston 14. Since in practice it is desirable that the striker plate 21 be in direct contact with the platform to which the shock is to be delivered, the striker piston may be moved to starting position by moving the platform as required. At the same time air is admitted through a port 101 opening into the cylinder 11 between the pistons 14 and 28, the port 101 being located at a point adjacent the right side of the piston 14 when the piston 14 is in its extreme right position, and the piston 28 is moved to the right to starting position.

When the piston 28 is moved to the right to starting position, the weight of the piston shaft latching mechanism causes the rollers 49 to be moved downwardly into locking position by the pivoting action of the block 51. The cam plates 57 are then pivoted in a counter clockwise direction to cause the recessed shoulder 61 to engage the lugs 60 formed on either side of the block 51 in latching position. Air is then admitted through the main charging port 104 to the charging chamber of the cylinder 11 to obtain the required pressure. After the air in the charging chamber is at the required pressure, the exhaust valve 70 is preloaded by bleeding the front end of the exhaust valve cylinder to atmospheric pressure and air at the charging pressure is admitted to the rear end of the exhaust valve cylinder through the port 78. As stated hereinbefore, the diameter of the valve piston 76 is made less than the diameter of the poppet valve 70 so that in the preloaded condition described, the resultant static forces will be sufficient only to maintain a tight seal. Where atmospheric pressure is to be used between the pistons 14 and 28, the pressure is then adjusted therebetween as required and at the same time is similarly adjusted on the left side of the piston 14. If greater than atmospheric pressure is to be used between the pistons, air at the required pressure is applied through the port 101 closed by plug 110 and also through port 100 closed by plug 111 to the space between the front piston and the end plate 18, the latter being necessary to maintain the position of the front piston until the rear piston is released. If less than atmospheric pressure is desired in the space between the pistons, the air therein is exhausted through an exhaust port 105 closed by plug 112, and adjacent the inlet port 101 to obtain the required degree of vacuum. In this case the position of the front piston is maintained by the collar 22 on the shaft 17.

After obtaining the required absolute pressure in the space between the pistons, firing is accomplished by energizing the piston assembly 64 to rotate the cam plates 57 in a clockwise direction, as hereinbefore described. When the rear piston 28 is released, it is driven forward by the expansion of the air in the charging chamber and compresses the air between the pistons. As the pressure in the charging chamber decreases due to expansion, the resultant force on the exhaust valve will change in direction and will tend to open the valve because of the near balance theretofore established. However, the valve is temporarily held closed by the latching mechanism 83. The loss of the sealing force resulting from the pressure in the exhaust chamber dropping causes a slight unseating of the poppet valve; by holding the dimensional tolerances of the latching assembly 83 within close limits, it has been found in practice that the loss is insignificant. Compression of the air between the pistons 14 and 28 causes the piston 14 to move forward and causes the striker plate 21 to deliver an impact, the air between the piston 14 and the end wall 18 being released through venting apertures 106, formed in the shaft 17, having their left ends so located that when the piston 14 is in its extreme right position they are effectively closed by the plate 18, as may be seen in Fig. 2, but so located that as the piston 14 begins to move forward, the ends are moved beyond the wall 18 and exposed to atmospheric pressure. The venting apertures 106 communicate with a centrally disposed aperture 107 in the shaft 17 which connects at its right end with a number of radially extending venting apertures 108, the outer ends of which extend to the left surface of the piston 14. Thus prior to any considerable pressure developing in the chamber formed between the end plate 18 and the piston 14, the forward movement of the shaft 17 exposes the ends of the venting apertures 106 and permits the air to escape.

As the piston 28 moves forward, the cam roller 90 following the cam surface 96 raises the push rod 83 and releases the valve stem 72. The poppet valve is then free to move to the left to open the exhaust chamber. Since the pressure on the right side of the piston 76 in the chamber 75 is maintained at the original charging pressure, as the pressure in the charging chamber and exhaust chamber drops due to the adiabatic expansion of the air therein, the pressure on the right side of the piston 76 will tend to open the exhaust chamber. The opening of the exhaust chamber poppet valve is timed to occur just prior to the piston 28 reaching its maximum forward thrust so that as the piston 28 begins to recoil, the exhaust chamber exit will be fully open permitting escape of the air in the charging chamber through the ports 74.

By reason of the design of the present apparatus the duration of the impact or shock, the peak acceleration, and the final velocity may be predetermined. These factors are, of course, inter-related and in any given case a selection of the values desired for any two of these factors determines the value of the third factor.

Figure 6:
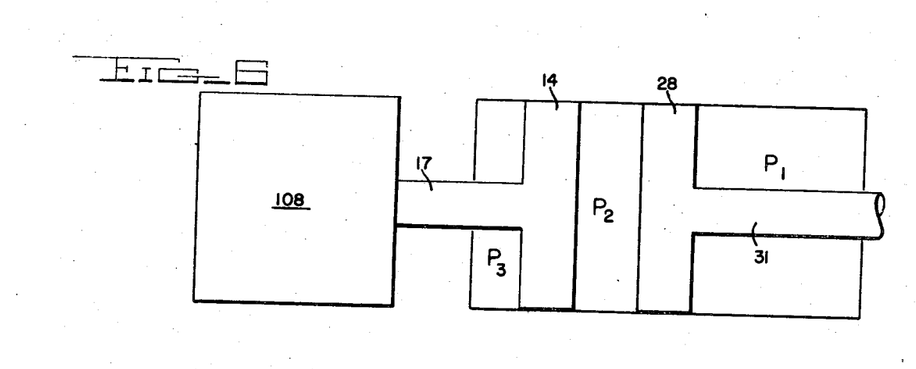
Fig. 6 is a diagrammatic representation of this impact device.

The essential parts of the impact device that must be considered in a theoretical analysis are shown in Fig. 6. It will be noted that the various control mechanisms and construction details which are needed in the actual equipment have been omitted and that a platform 108 on which the equipment under test is mounted is shown, the forward end of the shaft 17 of the forward piston 14 being in contact with the edge of the platform. The mass of the piston 14 and of the platform and equipment located thereon may be considered as a unit and represented by the symbol M. If the pressure $P_2$ between the two pistons is atmospheric or greater than atmospheric, the pressure $P_3$ ahead of the forward piston is, as hereinbefore stated, made equal to $P_2$. Thus the pressure $P_2$ between the two systems will not push the piston 14 and the platform away from its normal, or firing position previous to the initiation of the shock cycle. The pressure $P_1$ in the charging chamber to the rear of piston 28 is, of course, much greater than the pressure $P_2$ previous to firing.

At the moment that the latching mechanism holding the piston 28 is released, the initial force ($F_1$) acting on the piston 28 and urging it to the left, is equal to the pressure in the charging chamber ($P_1$) times the exposed area on the rear surface of piston 28 less the pressure between the piston ($P_2$), multiplied by the area of piston 14 on the side between the two pistons, and may be represented by the equation $F_1 = P_1 \times A_{28} - P_2 \times A_{14}$, wherein $F_1$ equals the force acting on piston 28, $A_{28}$ the area on the rear surface of piston 28 and $A_{14}$ the area of piston 14.

As the piston 28 moves forward, the pressure $P_2$ between the pistons increases rapidly and the force exerted by this pressure upon piston 14 tends to move piston 14 and the platform forward. Since the mass M in a practical case is many times the mass of the piston 28 and shaft 31, the gas between the pistons will be compressed to a pressure correspondingly exceeding the initial pressure in the charging chamber. The piston 28 comes to rest when the energy expended by the expansion of the gas in the charging chamber is equal to the sum of the work done on the gas between the two pistons and the work done on the piston 14 and the platform; that is, when the work done by the adiabatic expansion of the gas in the charging chamber has caused the pistons 14 and 28 to attain the same velocity, the pressure between the two pistons will have reached a maximum: thereafter, the piston 28 recoils. Since, in a practical case, the mass of piston 14 and the platform greatly exceeds the mass of piston 28, the pressure $P_2$ between the pistons when the pistons are moving at the same velocity will exceed the initial pressure in the charging chamber $P_1$ by many times and thus, for the short time interval during which the pressure between the pistons is many times the initial pressure in the charging chamber, a large force (shock) is exerted upon the piston 14 and platform 108, and, at the same instant, an equal and opposite force is exerted upon the piston 28. Piston 28 is thus decelerated and then, reversing direction, accelerated rapidly by the force exerted on piston 28 by the gas between the pistons.

The magnitude and the duration of the shock and the minimum spacing between the piston are a function of the initial pressure between the pistons and the gamma value of the gas between the pistons. Thus it is possible to increase the range through which the magnitude and duration of the shock can be varied by using gases with different gamma values from that of air for the gas between the two pistons. For example, while air has a gamma value of 1.4, argon having a gamma value of 1.6, which is higher than that of air, may be employed and will enable a longer duration shock, that is, a shock having a lower peak acceleration, to be obtained with the same minimum spacing between the two pistons at the moment of recoil of the piston 28.

It will be apparent that sufficient pressure and volume must be maintained in the space between the pistons to prevent the piston 28 from striking the piston 14. By employing a gas having a low gamma value, a greater pressure may be developed between the pistons than would be the case with a gas of higher gamma value and yet the minimum spacing between the pistons be unaffected. Ordinarily, of course, an increase in final pressure for any given initial pressure is achieved only by increasing the compression of the gas between the pistons and thus decreasing the minimum spacing. Thus with all other factors equal, the substitution of a gas having a lower gamma value results in an increase in the spacing between the pistons at the moment of maximum pressure for the same peak pressure value.

The choice of a gas for the space between the pistons is also important from the standpoint of the temperatures involved since the gamma value of the gas affects the ultimate temperature which may be reached at the moment of maximum pressure. It should be noted also that since in a practical case the temperatures between the pistons may reach a very high order, exceeding the flash temperature of most oils, there is some danger of an explosion resulting from the oil used to lubricate the pistons. For this reason it is desirable that the oil used be of the non-combustible type. By employing a gas having a lower gamma value than that of air the maximum temperature can be controlled and for the same peak pressure will be less than that which would occur if air were used, thus reducing the danger of explosion where a combustible lubricating material is used. For example, using a gas having a gamma of 1.2 the maximum temperature obtained will be approximately one-half that of the temperature obtained using air (gamma 1.4) for the same peak pressure.

From the foregoing it will be apparent that in accordance with the present invention an impact device has been provided whereby the magnitude of the shock, the velocity of the shock, the acceleration of the shock and the duration of the shock may be controlled. The driving force $F_1$, of course, predetermines in large part the final velocity and this, given a mass of any given size, determines the magnitude of the shock. However, for any given final velocity, the duration of the shock and the acceleration may be varied. In general, increasing the gas pressure between the pistons increases the shock duration and consequently lowers the acceleration. On the other hand, increasing $F_1$ by increasing $P_1$, the charging pressure, increases the velocity and if $P_2$ is held the same, then the velocity and acceleration are increased. Increase in velocity of course directly affects the magnitude of the shock.

For purposes of illustration, the following table is given showing the variations obtained by varying $P_1$ and $P_2$ in a practical embodiment of this invention. It will be understood that these figures are merely illustrative of a typical operation in accordance with this invention and are in no way to be construed as a statement of the limitations of the device in a practical embodiment thereof. In this table G represents the acceleration in terms of the force of gravity. D represents duration of the shock in terms of milliseconds and is taken as the period of time required for the impact force to increase from one half its peak magnitude to peak and to return to half its peak magnitude. V represents final velocity in feet per second.

|  | $P_1$ | $P_2$ | G | D | V |
|---|---|---|---|---|---|
| (1) | 41 | 5 | 28 | 4 | 4 |
| (2) | 52 | 15 | 13.5 | 10 | 3 |
| (3) | 83 | 4 | 300 | .4 | 6 |
| (4) | 98 | 16.5 | 54 | 4 | 6 |
| (5) | 182 | 6 | 1,000 | .4 | 9 |
| (6) | 188 | 11.5 | 400 | 4 | 9 |

Since, as hereinbefore stated, in a practical case the mass M will exceed substantially the mass $m$ of the piston 28, the acceleration during the recoil of the piston 28 will proportionately exceed the maximum acceleration during the forward motion of the piston 28 and thus the kinetic energy of the piston 28 may reach a very high magnitude. Consequently, unless some means is provided for preventing a rebound of the piston 28 a secondary shock will be produced. From a test standpoint this is highly undesirable since a computation of the forces involved and applied to the platform during the secondary shock is extremely difficult. Furthermore, since the primary purpose of this impact device is to simulate the shock resulting from the firing of a ship's gun, or an explosion resulting from enemy action, either of which involve no substantial secondary shocks, it is desirable that secondary shocks be reduced to unimportant values if not eliminated entirely from the impact device. However, because of the forces involved, it is impractical to design a latching mechanism whereby rebound of the piston 28 may be prevented. Therefore, in accordance with the present invention, the exhaust chamber and associated exhaust ports 74 are so designed that as the piston 28 recoils, tending to compress the air in the charging chamber and transferring the kinetic energy from the piston to potential energy in the air, the energy delivered to the air in the charging chamber is dissipated as the air escapes through the ports 74. The size of the ports 74 is selected with reference to the size of the charging chamber and the energy to be dissipated so that by the time the piston 28 has moved rearwardly sufficiently to close the ports 13 leading to the exhaust chamber, substantially all of the kinetic energy in the piston 28 is expended and in this manner secondary shocks substantially avoided.

While most of the kinetic energy gained during recoil is expended compressing the air in the charging chamber and the potential energy so accumulated in the air is dissipated as the air escapes through the ports 74, should some energy remain, the remaining energy compresses the air trapped in the portion of the charging chamber to the rear of the exhaust port 13 causing a slight rebound of the piston 28. However, since, as the piston 28 recoils, it opens the chamber formed between the pistons to the exhaust ports 13, the pressure in the exhaust chamber is applied to the forward face of the piston 28. This equalization of the pressure aids in reducing the possibility of a secondary shock. In practice it has been found that by a proper selection of the size of the ports 74 the rebound, if it occurs at all, will be insufficient to cause a secondary shock.

Where herein the several parts of this invention have been referred to as being in an upper or lower position, or in a right or left position, it will be understood that this is done solely to facilitate description and that the references relate only to the relative positions of the parts as shown in the accompanying drawings.

While but one embodiment of this invention has been shown and described, it will be understood that many changes and modifications may be made therein without departing from the spirit or scope of the present invention.

The invention shown and described herein may be manufactured and used by or for the Government of the United States of America for governmental purposes without the payment of any royalties thereon or therefor.

What is claimed is:

1. In a pneumatic impact device, a cylinder, a striker piston slidably journalled in the forward end thereof, a driving piston slidably journalled in said cylinder and spaced rearwardly from said striker piston, means for adjusting the initial pressure between said pistons, means for applying pressure to said driving piston to cause said striker piston to deliver an impact, and an exhaust valve for said cylinder fully opened at the end of the piston stroke at a given rate independently of the speed of the piston.

2. In a pneumatic impact device, a cylinder, a striker piston slidably journalled in the forward end thereof, a driving piston slidably journalled in said cylinder and spaced rearwardly from said striker piston, means for adjusting the initial pressure between said pistons, means for applying pressure to said driving piston to cause said striker piston to deliver an impact, and pneumatic means associated with said cylinder for absorbing the kinetic energy resulting from the recoil of said driver piston to prevent secondary shocks.

3. In a pneumatic impact device, a cylinder, a striker piston slidably journalled in the forward end thereof, a driving piston slidably journalled in said cylinder and spaced rearwardly from said striker piston, means for adjusting the initial pressure between said pistons, means for applying pneumatic pressure to said driving piston to cause said striker piston to deliver an impact, and latching mechanism associated with said driver piston for controlling the release of said piston.

4. In a pneumatic impact device, a cylinder, a striker piston slidably journalled in the forward end thereof, a driving piston slidably journalled in said cylinder and spaced rearwardly from said striker piston, means for adjusting the initial pressure between said pistons, means for applying pressure to said driving piston to cause said striker piston to deliver an impact, an exhaust chamber connected to said cylinder, a poppet valve for opening and closing said exhaust chamber, latching means for locking said poppet valve in closed position, and means controlled by the movement of said driver piston for releasing said latching means.

5. In a pneumatic impact device, a cylinder, a striker piston slidably journalled in the forward end thereof, a driving piston slidably journalled in said cylinder and spaced from said striker piston, a gas having a gamma value substantially that of argon in the space between said pistons, and means for applying pressure to said driving piston to cause said striker piston to deliver an impact, and an exhaust valve for said cylinder fully opened at the end of the piston stroke at a given rate independently of the speed of the piston.

6. In a pneumatic impact device, a cylinder, a striker piston slidably journalled in the forward end thereof, a driving piston slidably journalled in said cylinder and spaced from said striker piston, a gas having a gamma value substantially that of argon in the space between said pistons, means for applying pressure to said driving piston to cause said striker piston to deliver an impact, and pneumatic means associated with said cylinder for absorbing the kinetic energy resulting from the recoil of said driver piston to prevent secondary shocks.

7. In a pneumatic impact device, a cylinder, a striker piston slidably journalled in the forward end thereof, a shaft affixed to said piston and extending through an end of said cylinder, a driving piston slidably journalled in said cylinder and spaced from said striker piston, a shaft fixed to said driving piston and extending through the opposite end of said cylinder, the space between said driving piston and the latter end of said cylinder forming a charging chamber, said charging chamber having an exhaust chamber connected thereto, means for opening and closing said exhaust chamber, said opening and closing means being controlled by the movement of said driver piston shaft, a gas in the space between said pistons, means for adjusting the initial pressure of the gas between said pistons, and means for applying pressure to said driving piston to cause said striker piston to deliver an impact.

OSCAR C. DRESSER.
OSCAR NORGORDEN.
FRANCIS J. SHANAHAN.
CARROLL R. SHULER.

REFERENCES CITED

The following references are of record in the file of this patent:

UNITED STATES PATENTS

| Number | Name | Date |
|---|---|---|
| 427,399 | Campbell | May 6, 1890 |
| 671,505 | Winsor | Apr. 9, 1901 |
| 937,009 | Palmer | Oct. 12, 1909 |
| 1,160,427 | Marcus | Nov. 16, 1915 |
| 1,308,811 | Scott | July 8, 1919 |
| 2,159,879 | Dewandre | May 23, 1939 |
| 2,241,184 | Clark | May 6, 1941 |
| 2,402,920 | Seibold | June 25, 1946 |

FOREIGN PATENTS

| Number | Country | Date |
|---|---|---|
| 542,292 | Great Britain | June 2, 1942 |